March 5, 1974  W. WENGELER  3,795,504
PROCESS FOR PRILLING FERTILIZER MELTS
Filed Sept. 7, 1972
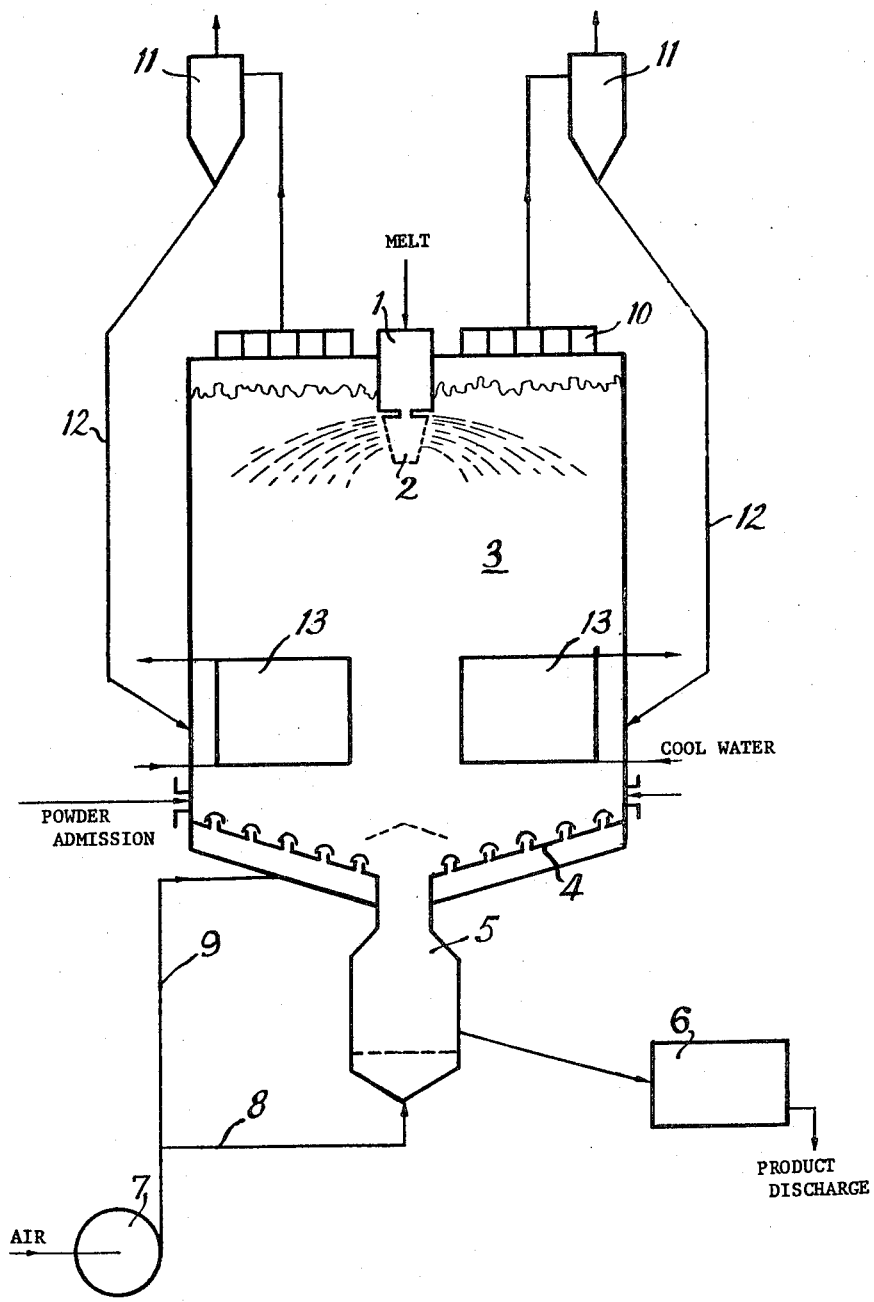
INVENTOR
WILHELM WENGELER
ATTORNEY 3,795,504
PROCESS FOR PRILLING FERTILIZER MELTS
Wilhelm Wengeler, Bochum-Stiepel, Germany, assignor to Friedrich Uhde GmbH, Dortmund, Germany
Continuation-in-part of abandoned application Ser. No. 107,999, Jan. 20, 1971. This application Sept. 7, 1972, Ser. No. 286,906
Int. Cl. B22d 23/08
U.S. Cl. 71—64 DB 2 Claims

ABSTRACT OF THE DISCLOSURE

Process for prilling fertilizer melts in which the hot fertilizer melt is sprayed in the upper portion of a tower inside a fluid bed which has a minimum density of 100 kg./m.$^3$ and a settling velocity of the prills of 10 to 20 cm./second. The fluid bed is formed by air under pressure, and dust and powder are introduced in a particular manner. The dust is separated from the prills and introduced to the tower to assist in forming the fluid bed. The prills are cooled as well as powder coated and solidified as they reach the bottom of the tower.

CROSS REFERENCE TO RELATED APPLICATION

This application constitutes a continuation-in-part of application, Ser. No. 107,999, filed Jan. 20, 1971, now abandoned.

BACKGROUND OF THE INVENTION

The present invention relates to the prilling of melts, especially for the prilling of fertilizer melts, the melt being sprayed with the aid of a perforated rapidly rotating spray bucket or of spray nozzles.

The hot ferilizer melts must be transformed rapidly into a granular solid state. The granular material might require powder coating to achieve the necessary stability for transportation and storage. In addition, the process must not be expensive from an equipment point of view and must be trouble-free in operation.

It is known to manufacture prills by permitting the melt to pass through dropping devices, for example perforated containers, into a prilling tower in which the droplets descend freely to solidify to prills in a countercurrent stream of air or an equivalent fluid. Prilling towers are either steel or concrete structures.

It is also known to improve these processes by admixing small quantities of powdered coating material with the air stream. This method ensures better cooling and improved solidification of the droplets with consequent shortening of the falling distance, and simultaneous powder coating. It is one of the characteristic features of the process using a gas dispersoid that the velocity of the carrier gas is far beyond the exhaust velocity of the solid particles so that large quantities of dust are discharged from the prilling tower. Voluminous and expensive separating equipment is needed for the recovery of this dust. The known process depends on a large volume of recycle gas dispersoid. The stationary dropping device requires a low density and a high velocity of the gas dispersoid to avoid a clogging of or a build up of material on the dropping device. Moreover, the dropping device is arranged to avoid the impact on it of gas dispersoid. Therefore, the method excludes any possibility of reducing the size of the prilling tower. The height of known prilling towers is 2 to 5D.

Any attempt to use known prilling devices, such as spray buckets or spray nozzles, for ejecting the droplets at a velocity exceeding the free settling velocity results in an insufficient deposition of coating powder on the prills by the known process. Prilling devices, such as spray buckets or spray nozzles have a higher throughput as compared to dropping devices designed for a purely static discharge of the liquid. Coating powder deposition by the known method is, therefore, inadequate.

The known process makes use of a dilute-phase fluid bed and of a bulk material layer which is in a state of nascent fluidization. Heat exchangers are arranged in this bulk material layer to dissipate the heat of solidification emitted by the prills. It is known that a bulk material layer permits less heat transfer than a fluid bed. Referring to the known processes it is not possible, however, to arrange the heat exchangers within the dilute-phase fluid bed because the semi-solidified prills would hit upon these cooling devices and crush through the force of impact.

In a prilling tower with no or little admission of coating powder, that is with dust-free or nearly dust-free cooling of the prills, the prills collect in a preferred area of the bottom, more specifically in the area that is included in the maximum circle of the spraying cone. An irregular collection of prills on the perforated bottom entails an irregular air flow and, consequently, a reduced cooling effect across the tower.

SUMMARY OF THE INVENTION

The object of the invention is to eliminate the drawbacks of known methods and to provide a process that will ensure both minimum expenses from the standpoint of equipment and structures and optimum quality of the prills. This is accomplished by spraying the fertilizer melt inside a fluid bed consisting of a powder, said bed having a minimum density of 100 kg./m.$^3$ and wherein the settling velocity of the prills is 10 to 20 cm./second.

Another feature of the invention involves the production of the admixed powder with a grain size of less than 60 microns.

The process equipment consists of a vertical tower whose upper part comprises a device for spraying the melt and whose lower part comprises a product discharge nozzle and facilities for the admission of air to produce a fluid bed. Such equipment is characterized by air admission facilities comprising a bubble-cap tray. For dissipating excess heat of solidification, cooling facilities may be installed in the lower part of the prilling tower. These heat exchangers must be arranged within the fluid bed that has a minimum density of 100 kg./m.$^3$.

The invention incorporates the particular advantages that a dense-phase fluid bed is produced and that the velocity of the air is below the exhaust velocity of the fluid-born solids. In this way, the following advantages are achieved.

(1) The quantity of dust discharged from the equipment is moderate; therefore, no expensive dust collecting facilities are needed.

(2) The droplets from the prilling device are ejected immediately into the dense-phase fluid bed in which they are retarded with consequent reduction of their free-settling velocity and prolongation of their retention time in the tower.

(3) The reduction of the free-settling velocity of the prills in the dense phase also narrows the ejection cone. Therefore, the diameter of the prilling tower and, consequently, the volume of structural work are reduced.

Because the hot melt droplets are contacted directly with the coating powder, a quasi-baked bond between the materials is achieved which renders the prills extremely abrasion resistant. Owing to the arrangement of the heat exchangers within the dense-phase fluid bed, an intense heat exchange between powder particles and heat exchangers is achieved with consequent high heat transfer from the prills to the powder particles. The method of the invention incorporates improved heat dissipation. Because of the higher density of the fluid bed and of the moist surface of the melt droplets, powder-coating of the prills is almost complete. As compared to known processes, the gas throughput is lower because of the reduced air velocity. Owing to these improved conditions, the height of the tower may be reduced to approximately 1 to 1.5D.

Spraying the melt inside the dense-phase fluid bed results in a regular distribution of prills on the tower bottom owing to the non-uniform reduction of the free settling velocity of the prills. This regular distribution of prills on the perforated tower bottom leads to a regular air flow and, consequently, to a uniform composition of the fluid bed.

BRIEF DESCRIPTION OF THE DRAWING

The figure is a diagrammatic view of a process for prilling melts embodying the invention.

DESCRIPTION OF PREFERRED EMBODIMENT

The illustrated embodiment of the invention comprises a vertical tower in the upper end of which there is a centrally disposed spraying device 1 to which the hot fertilizer melt is delivered in any suitable manner. The spraying device 1 is shown in the form of a motor driven tapered bucket 2 having foraminous side walls which is rapidly rotated about a vertical axis. The spraying device is arranged inside the fluid bed. The sprayed particles are brought immediately into contact with powder particles of a size less than 60 microns, controlled quantities of which are forced through lateral nozzles in the lower part of the tower (see legend "Powder Admission"). The sprayed particles drop through a dense-phase fluid bed 3 enroute to a receiving tray 4 and during such path, the prills are cooled as well as powder coated and are solidified upon arrival at the tray. The fluid bed 3 has a minimum density of 100 kg./m.$^3$ and the prills have a settling velocity of 10 to 20 cm./second.

The air required for producing the fluid bed 3 is supplied from a source 7, and part of it is diverted through line 8 to a dust separator 5 where excess dust is separated from the prilled product, while the balance passes through a line 9 to the bottom of the prilling tower. The air emitted from the line 9 passes through the receiving tray 4 to build up and maintain the fluid bed 3. It is supplemented by the air which rises from the dust separator 5 and carries the dust entrained by the prills.

The receiving tray 4 inclines downwardly and inwardly from opposite sides and has a central outlet above which is a baffle for directing the prills to the inclined portions. The tray 4 has a series of upstanding nozzles or air outlets, and above each is a baffle so that the prills dropping on the tray move to the central outlet and pass to the dust separator 5. From the separator 5, the dust-free prills pass to a cooler 6 from which they are withdrawn for further handling.

In the upper part of the prilling tower, the top of the fluid bed 3 is maintained a short distance above the spraying zone created by the spraying device 1. Any dust particles entrained by the air stream leaving the prilling tower through collecting areas 10 are retained in separators 11 which are in communication with such areas. The clean air is discharged to the atmosphere, but the separated dust passes through the ducts 12 to the lower portion of the prilling tower and contributes to the building up of the fluid bed 3.

In the event that the heat given off by the hot fertilizer melt cannot be dissipated by the air to ensure sufficient cooling of the prills, cooling devices 13, of any conventional design, such as using circulating cool water, may be disposed in the fluid bed 3. These devices are so arranged as to avoid deterioration of the fluid bed as well as to militate against any accumulation of free-setting prills on them.

What I claim is:
1. The process for prilling fertilizer melts or the like, comprising spraying the melts inside a fluid bed having a powder ingredient, said bed having a minimum density of 100 kg./m.$^3$, and the prills having a settling velocity of 10 to 20 cm./second, whereby the sprayed particles enter immediately into the fluid bed.
2. The process for prilling as claimed in claim 1, in which said spraying comprises centrifugalizing the melts.

References Cited
UNITED STATES PATENTS

| | | | |
|---|---|---|---|
| 3,457,336 | 7/1969 | Harris | 71—64 D B X |
| 2,600,253 | 6/1952 | Lutz | 71—43 X |
| 3,059,280 | 10/1962 | Laehder | 71—64 D B X |
| 3,533,776 | 10/1970 | Coates et al. | 71—64 D B X |
| 3,539,326 | 11/1970 | Otsuka et al. | 71—64 D B X |

SAMIH N. ZAHARNA, Primary Examiner

R. BARNES, Assistant Examiner

U.S. Cl. X.R.

264—14